United States Patent Office 3,425,630
Patented Feb. 4, 1969

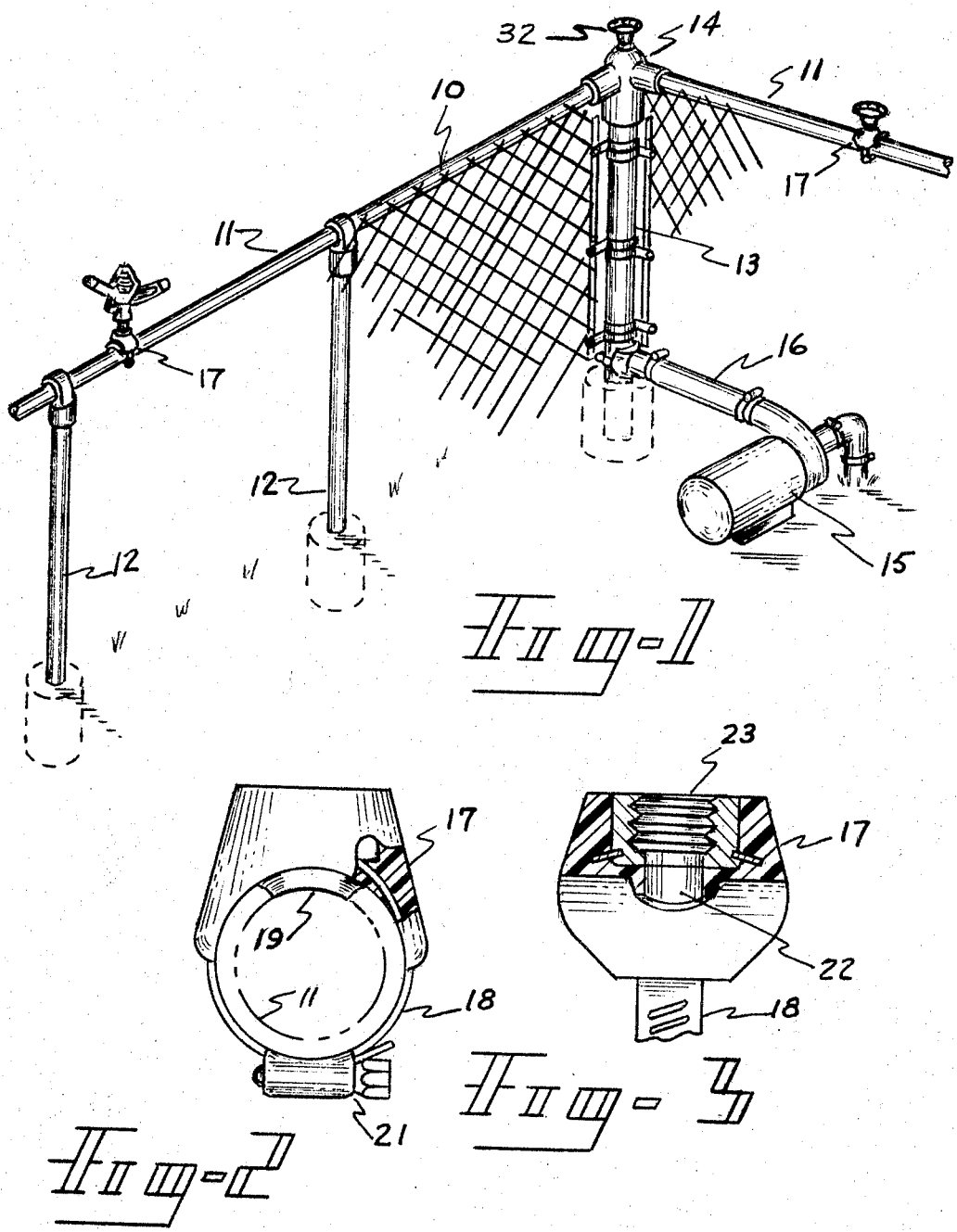

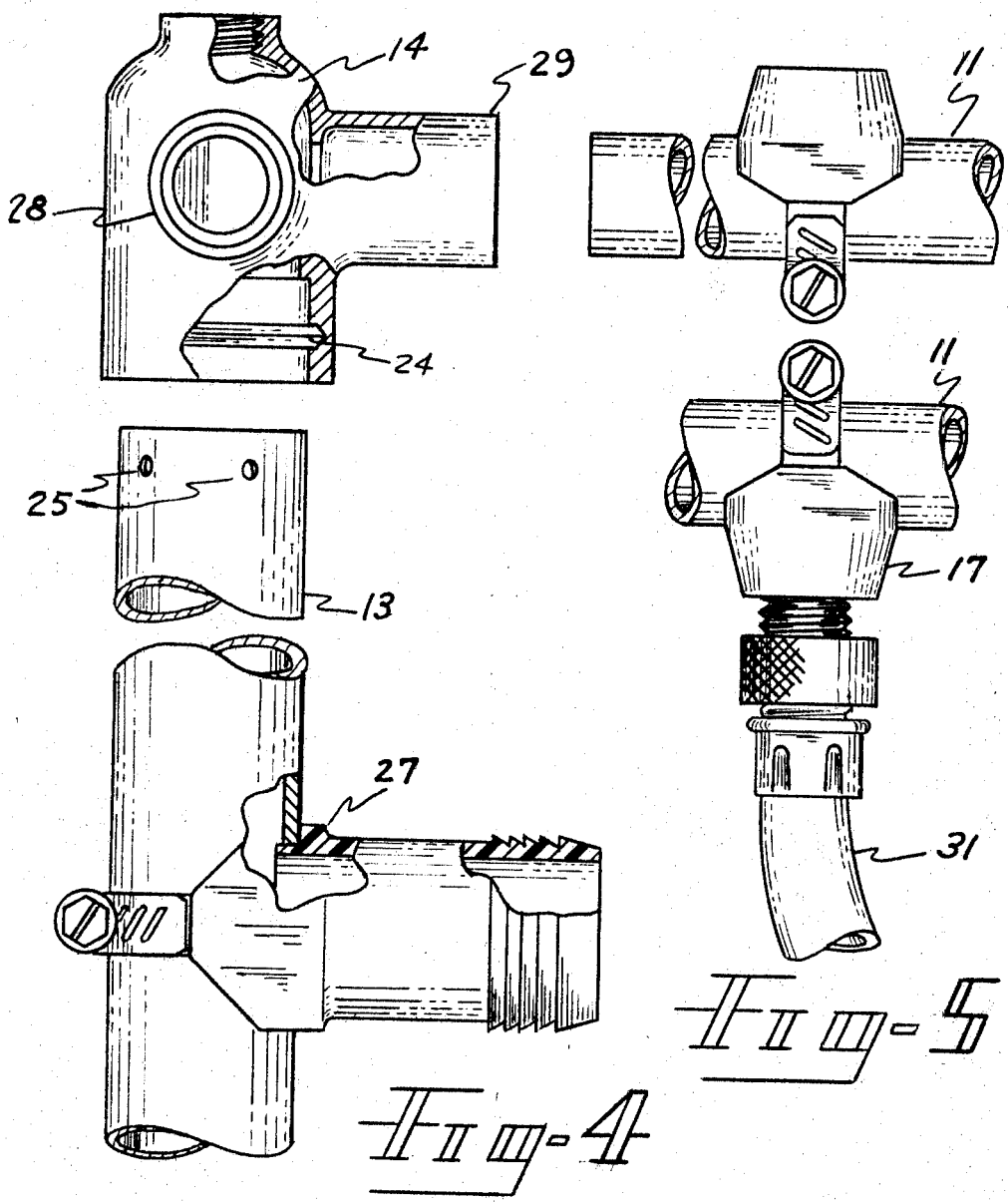

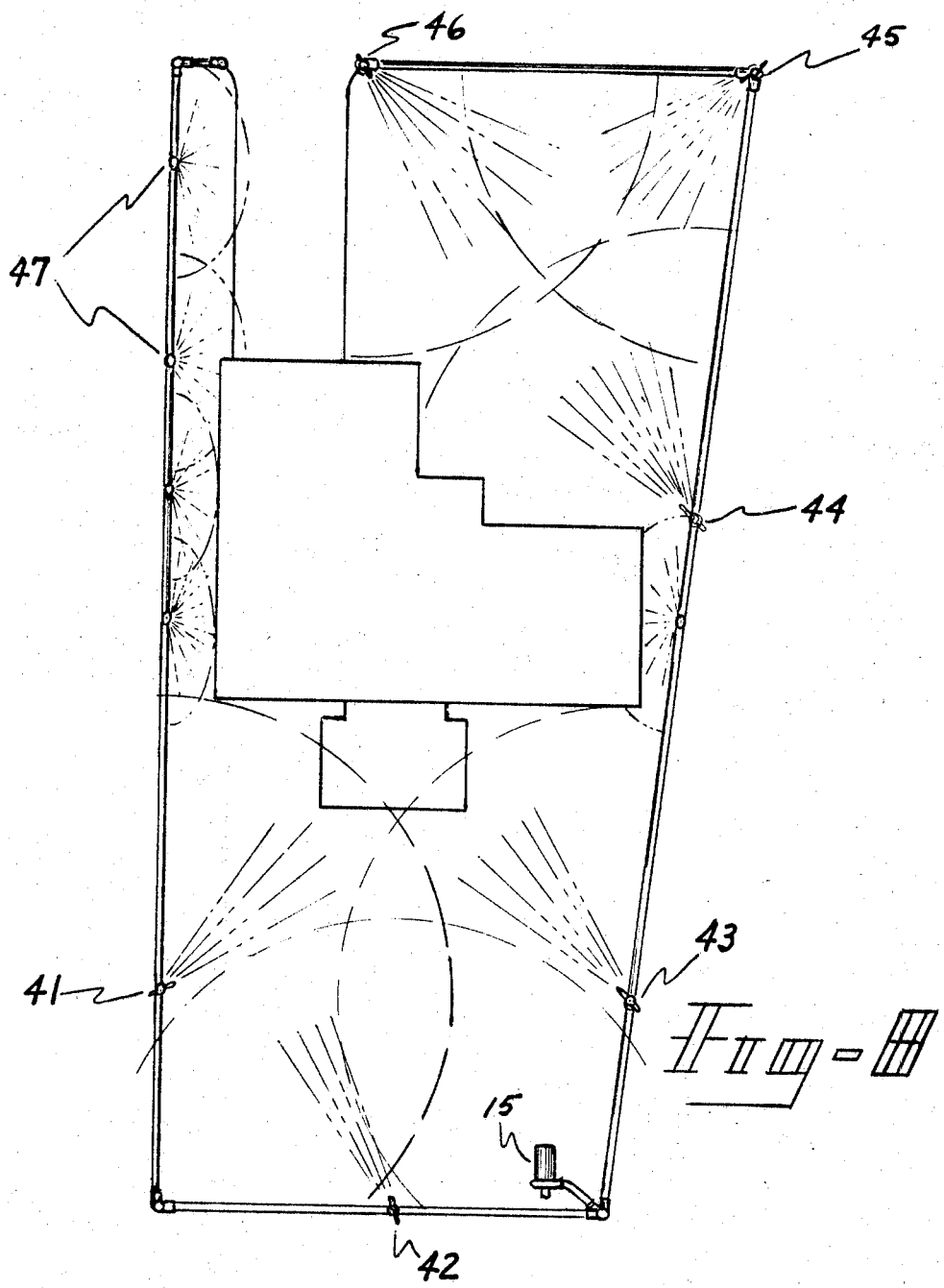

3,425,630
SPRINKLER FENCE
Keith C. Fessler, Sr., 1820 Sarazen Drive,
Orlando, Fla. 32808
Filed Jan. 17, 1966, Ser. No. 521,047
U.S. Cl. 239—208    5 Claims
Int. Cl. B05b 1/00, 9/00; E04h 17/02

This invention relates to an improved irrigation arrangement for lawn or garden, and more particularly to a combination fence and irrigation arrangement in accordance with which a chain link fence or the like may be rapidly and inexpensively converted into a sprinkler arrangement, thus obviating the need for underground piping arrangements.

In the past, numerous irrigation arrangements have been proposed, but these have been characterized by their expense inasmuch as it was typically necessary for trenches to be cut and underground piping to be laid. Further, even after the initial expense, it has been found disadvantageous and even dangerous in many instances to have conventional spray fittings protruding at frequent locations about lawn or garden. This is of course because such protruding sprinklers not only tend to trip passersby, but also are unsightly as well as presenting an interference to lawn mowing operations or lawn use for games.

It has also been known in the past to obtain the advantages of spraying from a height rather than from ground level by disposing irrigation pipes at elevated locations about gardens and groves, but manifestly this involves considerable expense and presents much too unsightly an arrangement for a householder to consider for application in his yard.

In accordance with my invention, I advantageously utilize existing fences such as chain link fences or others utilizing horizontally disposed, tubular members for through such members water can be caused to flow for irrigation purposes, thus gaining for the owner the advantages of irrigating from a raised location while at the same time enormously decreasing the dollar outlay necessary for the creation of a highly satisfactory irrigation arrangement. In accordance with my techniques, it is necessary to replace only minor portions of existing fences in order to convert them to this new use and even the sprinkler heads to be utilized at spaced locations along the uppermost tubular fence member may be applied to such member without necessitating its removal from the fence or even requiring the cutting of the wire securing the fencing material to this member.

In order that these and other advantages may be obtained, I utilize a novel basic concept for the fittings to be utilized with my sprinkler fence, which fittings are internally configured to allow the flow of water up therethrough, and externally configured on their inner portions to match the outer curvature of the longitudinal tubular members of the fence. Encircling straps are provided on each fitting whereby it can be secured in an encompassing manner tightly about the tubular member. Each fitting is designed to be placed over a hole of pre-established size that is drilled into the tubular member, with fluidtightness being achieved by virtue of the provision of a protruding circular seal located on an inner portion of the fitting in such a manner that this seal effectively seats in the hole in the tubular member as the clamp of the fitting is tightened. Upon an upper portion of the basic fittings the desired type of sprinkler head can be threadedly inserted.

An adaptation of this basic fitting can be utilized for supplying water to the fence, and the water supply fitting may either be applied to an upper tubular member of the fence or to a fence post as may be preferred. Although the water supply fitting normally utilizes somewhat larger pipe inasmuch as fence posts are typically larger in diameter than the horizontally disposed members, I nevertheless prefer to utilize the same drilled hole—circular seal arrangement as set forth in conjunction with my quick disconnect fittings arranged to receive sprinkler heads.

As many homeowners are aware, the tubular members utilized in most fences are not interfitted in a fluidtight manner, so it is of course necessary for the fence owner utilizing my concepts to take steps to assure that the irrigation fluid will not be lost at the junctures occurring at the corner posts. I find it is preferable to surmount this problem by replacing the conventional member atop each corner post with a special manifold member of unique design that permits a watertight interconnection between the several tubular members intersecting at the corner post, with it being understood that this manifold member may itself be tapped to threadedly receive an appropriate type of spray fitting thereon. Other techniques are hereinafter described for preventing the loss of irrigation water at the periodically occurring junctures of the tubular members along the length of a fence.

As will therefore be seen, I have taken advantage of the fact that each owner of a fence utilizing tubular members inherently has the capability of creating an effective irrigation system for his yard or garden without the outlay of money for the purchase of long lengths of irrigation pipe. Operating in favor of this concept is of course the fact that fence materials are typically of rust proof construction both interiorly and exteriorly and also of a standard size, enabling the purchase of a selected number of my basic fittings, which the homeowner can dispose along his fence at intervals as best suit his needs for a spray pattern.

Although I mention tubular members as being of standard size, such is not a limitation since I prefer to provide the basic fitting with sufficient inherent resiliency so that it snugly adapts its inside diameter in a tight encircling fashion to the smallest or largest of the commonly used longitudinal tubular members. In other words, it is to be understood that one size fitting will fit any and all commonly used longitudinal tubular members. This advantage is readily apparent of course since it eliminates the need to gage or measure the tubular member outside diameter to select a fitting with a matching inside diameter. This same resiliency provides the circular inner seal of the fitting with the flexibility to assure positive contact with the inside diameter of the drilled hole in the tubular member regardless of interface irregularities. Although round tubing is more commonly utilized, half moon type adapters used in conjunction with rectangular tubing will convert the rectangular cross section to round in the area of my fitting allowing my same basic fitting to be utilized.

These and other objects features and advantages will be more apparent from a study of the appended drawings in which:

FIGURE 1 is a perspective view of a corner section of a typical fence in accordance with my invention in which a number of basic fittings as well as sprinkler heads are employed;

FIGURE 2 is a view, partly in section, of a typical basic T fitting, shown in the interfitted position with a tubular member;

FIGURE 3 is a view similar to FIGURE 2 but showing a basic fitting from different direction;

FIGURE 4 is somewhat of an exploded view revealing pump attachment details as well as a corner post modified in accordance with this invention;

FIGURE 5 is another use for my basic fitting, in this instance serving as an alternate form of water inlet to the fence, such as for city water supplied through a garden hose;

FIGURE 8 is a plan view of a typical house and lot arrangement showing preferred locations for the sprinkler devices on the fence.

Figures 6, 7:
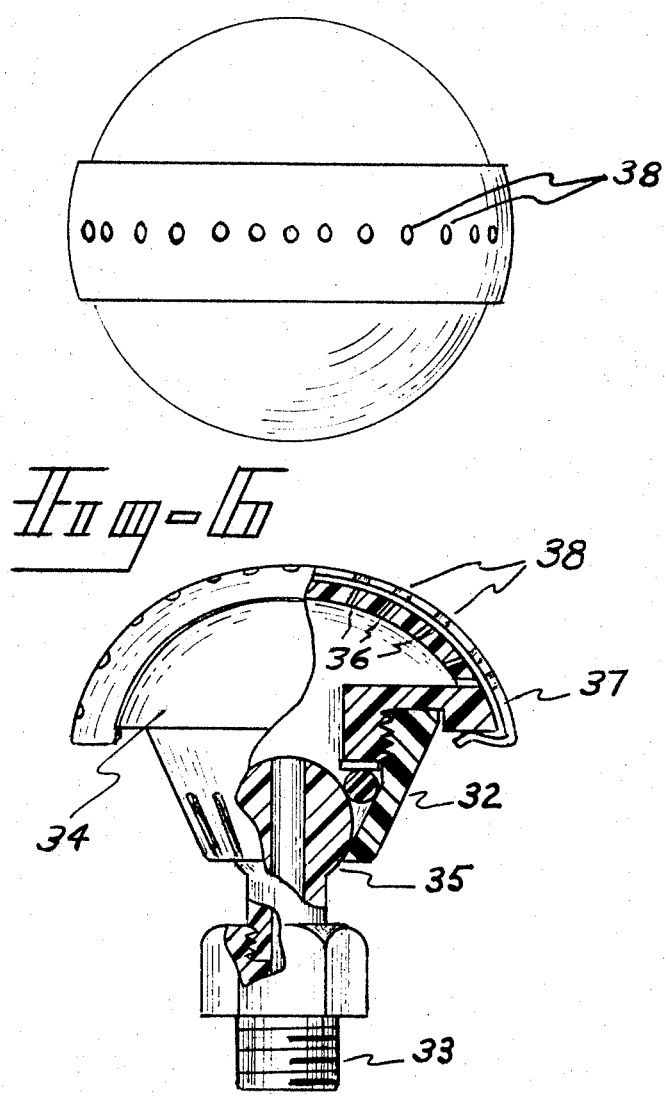
FIGURE 6 is a top view of a sprinkler head in accordance with this invention, this design being utilized where the area to be sprayed is not square, such as between two houses.
FIGURE 7 is a side elevational view, partly in section, of the device in accordance with FIGURE 6, and revealing the means whereby the flow of water can be modulated.

Turning now to FIGURE 1 it will be seen that sprinkler fence 10 comprises upper longitudinal tubular members 11 as well as periodically occurring fence posts 12, and a corner post 13. As will be explained hereinafter, I provide a novel manifold member 14 atop corner post 13 in accordance with this invention in order that the upper tubular members 11 can be interconnected, so that a continuous flow of water can take place from one part of the fence to another, through these members 11 and 14.

In the embodiment illustrated in FIGURE 1, the fence post 13 is used for the inlet for water to the fence, the water supply being furnished for example from the municipal water supply or from a well. In latter instances, a pump 15 provides a continuous supply of water under pressure to fence post 13 through interconnecting pipe 16. The details of this portion of my invention will be set forth in conjunction with FIGURE 4.

Water flowing upwardly in corner post 13 is re-directed by my novel manifold member 14 into upper tubular members 11 in such a manner as to achieve a proper division of water between these portions of fence that intersect at corner post 13. As is true with most types of cyclone fences or chain link fences of the type generally illustrated in FIGURE 1, the posts 12 utilize an encircling loop at their upper portions through which members 11 pass, so that the water tightness of any interconnections between members 11 and posts 12 is not involved. Although I refer to water flowing through my novel fence, it is to be understood that other fluids, such as liquid fertilizer or liquid weed killer may be utilized.

FIGURE 2 illustrates a typical basic fitting 17 in accordance with my invention, which utilizes an encircling lower strap 18 such as of stainless steel that is capable of being tightened by a screw driver, as well as a circular seal 19 disposed at an inner upper portion of the fitting 17. As will be apparent from a study of FIGURE 2, each of my novel fittings 17 is configured to encircle a pipe or tubular member 11, with the circular seal 19 preferably being tapered, and arranged to closely interfit with a hole of appropriate size that has been predrilled at a preferred location along the upper surface of a tubular member 11. Because of the tapered configuration of the seal 19, as the threaded bolt 21 is tightened, the strap 18 is caused to tighten in accordance with principles associated with radiator hose clamps, and therefore to grasp the member 11 quite tightly. This causes the seal 19 to enter the hole in the tubular member to an appropriate depth, and for a quite satisfactory fluidtight interconnection therewith. I prefer to make the tapered circular seal 19 of polyethylene, although if desired it could be made of polypropylene, nylon, rubber, or similar flexible material.

Turning to FIGURE 3 it will be seen that the basic fitting 17 has a hollow inner portion 22 and disposed thereabove a threaded fitting 23 whereby a appropriate type of sprinkler head may be threadedly attached to fitting 17. The portion of fitting 17 containing threads 23 may of different material from the rest of the fitting 17 as shown in FIGURE 3, or if desired, the fitting 17 can be made of one type of material throughout. An example of an appropriate material is polyethylene, although for convenience I may choose material made of 80% metal and 20% plastic, this being marketed under the trade name Devcon. This material may be easily molded into the desired configuration, including threads 23, after it has cured thoroughly, is ready to be used. If the threaded portion is an insert, I preferably extend the steel strap portion 18 upwardly in two portions so as to engage the sides of the threaded member, as shown in FIGURE 3.

Turning to FIGURE 4 it will be noted that the manifold member 14 is configured to be placed upon and sealed to the top of corner post 13, so that water supplied to corner post 13 through large fitting 27 (preferably located near the bottom of the post) will be caused to enter into and flow along the upper tubular members 11 to the fittings 17 disposed thereon. This substitution of a manifold 14 for conventional upper corner post members is made inasmuch as such conventional upper members on corner posts do not interconnect with the upper members of the fences so as to be able to direct water therealong. In contrast, water entering the central portion of my member 14 is directed into arms 28 and 29 of the member 14, and inasmuch as the upper tubular members 11 closely interfit in the passages defined in these arms, water is therefore directed along members 11. The member 14 can be secured to corner post 13 quite securely by virtue of the provision of a groove 24 on the inner bottom portion of member 14, and a number of holes 25 about the top of post 13. Upon the member 14 being secured in place by the use of joint compound, "keys" of such compound form to lock the groove and the holes together.

Although the inner portions of arms 29 and 28 may be threaded so as to receive members 11 that have been threaded in a complementary manner, I find it is much more expeditious to merely join the members 11 into the arms of member 14 by the use of Devcon or the like, for rarely is water pressure so high but what non-threaded, cemented joints may be utilized. In a similar manner, Devcon or other appropriate material may be utilized to secure the member 16 into fitting 27, as shown near the bottom of FIGURE 4, and at tubing splice joints occurring along the length of the fence. Concrete used for anchoring corner post 13 usually adequately serves as an adequate seal for the base of member 13.

Although holes for receiving fittings 17 are usually drilled along the upper portion of the members 11, if it is desired to attach the water supply fitting to a tubular member 11 rather than to a corner post 13, usually I drill the hole for the water supply fitting on the underside of a member 11 so that the hose or other member 31 supplying water to the fence can be disposed extending downwardly from the member 11 as shown in FIGURE 5 rather than protruding outwardly or upwardly.

Turning to FIGURES 6 and 7 it will be seen that I have provided a sprinkler head of the type that can be used in rather cramped locations, such as closely adjacent the house shown in outline in FIGURE 8, or atop manifold 14. As shown in FIGURE 7, threads 23 may be provided at the lowermost portion of sprinkler head 32 so as to enable this type of sprinkler head to be installed in the threads 23 of the fittings 17 at whatever location along the fence such is desired. The hollow upper portion 34 of each sprinkler head 32 is arranged to be pivotally adjustable so that water may be directed in whatever direction desired. This pivoting is of course obtained by providing a ball shaped portion 35 through which water is supplied, and about which the upper portion of the fitting may be tilted. Although I am not to be limited to a single row of the fitting may be tilted. Although I am not to be limited to a single row of holes 36 in the upper portion, I do find that one row of holes gives a highly desirable pattern. Flow rate is controlled by rotating the perforate slide flow control valve 37, inasmuch as the holes 38 therein, when moved out of alignment with holes 36, cause a modulation of flow from the sprinkler head.

Turning to FIGURE 8, it will be seen that I have provided in accordance with this invention a sprinkler fence arrangement extending virtually around the entire house, with the spray patterns obtained being represented on this drawing. For example, sprinklers 41, 42 and 43 may be of the type of oscillating sprinkler known as a Rain Bird, or equivalent, in this instance of the type adjusted to throw a 180° pattern. In contrast, sprinklers 44–46 are adjusted to oscillate only 90°. Sprinklers 47 are of the type shown in FIGURES 6 and 7 inasmuch as in locations of this type, only a narrow spray pattern is desired.

Although my quick disconnect type resilient fitting 17 is primarily designed to be used with a sprinkler fence, it is also readily apparent that this concept can be employed wherever junctures or T's are required to redistribute fluids from a tubular manifold of metal or plastic. In the past, fittings were made of metal and clamped to plastic tubing by means of a "U" flange. The "U" flange and fitting were not resilient and deformed the plastic tubing as bending stresses were applied to the metal fitting. The deformation tends to destroy the seal of the inside surface of the fitting with the outside diameter of the tube. In the case of plastic tubing the deformation will result in a reduction of cross sectional area of the tubular section to restrict flow of the gas or fluid flowing through it.

In contrast, my invention will necessitate only one size fitting for a wide range of tubular members and the virtues of its resiliency have been previously stated. Further, the circular protruding seal 19 on the upper inner portion of the seal provides a positive means for assuring that the fitting is accurately aligned with the drilled hole in the tubular member, eliminating the possibility that the drilled hole is partially covered and the flow restricted as might otherwise be the case. In addition, my basic fitting concept takes maximum avantages of hoop tension to distribute equal load to the tubular member when the fitting is tightened on this member in a manner not unlike that of a hose clamp.

As will now be obvious to the fence owner, in accordance with my concept he can utilize any proper longitudinal tubular member or members of his fence for carrying water to spray fittings installed in such member, such being accomplished with a minimum of labor and expense.

The fence owner should, of course, first check either the fence materials or contact the manufacturer thereof so as to be assured that a corrosion-preventive treatment has been applied to the inside as well as the outside of the longitudinal tubular members. Although most modern metal fences are internally and externally coated or else made of aluminum alloy, in the event that a fence is not initially suitable, it is recommended that the internal portion of the fence be treated by flushing with a commercially available corrosion preventing coating, and the exterior be appropriately painted as well. Devcon Z may be used for preventing corrosion, this being 95% zinc and 5% epoxy.

The fence owner should then make a plan view layout of his fence, setting forth its relation to his house, garage, swimming pool, and any other area or portion that typically should not receive an irrigation spray. By applying the known spray patterns from various sprinkler heads to the layout, he can accomplish the maximum coverage with the least number of sprinkler heads.

A kit comprising a drill, basic fittings, sealant, manifold members, and sprinkler heads can be marketed for a reasonable price, although many of the tool type components may of course be on hand in the average home workshop.

As to the installation procedure, existing corner post fittings are first removed and the ends of the longitudinal members that are to be fitted into the new upper corner post members are prepared, such as by scouring same with sandpaper, steel wool or the like. Similarly, the upper portions of the corner posts are prepared for receiving the new manifold members that will allow the flow of water from one portion of the fence to another. Also, each corner post should be inspected internally to make sure that the concrete used to anchor the post adequately seals the base, and if such is not sufficient, additional concrete or other sealant should be poured in the corner post to provide proper sealing.

To assure the proper securing of the upper fence post members, I recommend that several small holes be drilled about the upper portion of the fence post so that the Devcon, or other epoxy resin utilized, can extrude through such holes and serve as "keys" for locking the inner groove of the upper member 14 to the post. After such installation, the longitudinal members 11 can be secured in the passages in the corner post members 14 with epoxy or like adhesive, and any junctures between adjacent, connecting longitudinal members made fluidtight, also with epoxy or the like.

The fence owner may now proceed to drill appropriately sized holes at spaced locations along the upper part of the longitudinal members to receive the basic fittings. Any burrs created in the drilling process should be removed so that the various locating members or seals 19 can be properly received. In a similar manner, the water supply to the fence may be connected to the fence post or a longitudinal member as may be desired.

Advantageously, my basic fittings may be secured to the longitudinal members without "threading" the basic fittings the length of such longitudinal members, for by virtue of the inherently flexible nature of such fittings, they may be "snapped" over the longitudinal member at approximately the right locations and then carefully moved into position over the hole for which they are intended. Thereafter the two halves of the bands are properly interfitted, and by the use of a screw driver each fitting is appropriately tightened to assure watertightness.

Before installing the sprinkler heads on the fittings, I preferably turn on the water pressure to the fence for several minutes to flush out the system. The desired spray fittings are then installed and the patterns thereof adjusted so as to give the desired coverage.

I claim:

1. A sprinkler fence for providing an irrigating spray in the general vicinity of the fence, said fence comprising at least one longitudinal tubular member disposed adjacent an upper portion of the fence and adapted to carry fluid, a plurality of fittings clamped at spaced locations along said longitudinal tubular member, through which fluid can flow, and means for providing a flow of fluid to said longitudinal tubular member whereby said fittings can supply a desirable pattern of fluid for vegetation maintenance, said fittings each involving a circular seal disposed in an upper inner portion thereof, which seal is adapted to locate the fitting with respect to a hole provided in said longitudinal tubular member and to provide a fluid-tight relation therewith, and an encircling strap adapted to secure the fitting about said tubular member so as to assure a tight connection at said seal at such time as said strap is properly tightened, a corner post and at least two longitudinal members also being used, and a manifold member being secured to the upper portion of said corner post, said manifold member having interconnected passages extending through its confines, said passages each being configured for receiving in sealed relation, one end of one of said longitudinal tubular members, said manifold member thereby providing an interconnection for the flow of irrigating fluid from one longitudinal tubular member through said corner post, and thence to the other longitudinal tubular member, and thereby along said fence.

2. A sprinkler fence for providing an irrigating spray in the general vicinity of the fence, said fence comprising at least two longitudinal tubular members disposed adjacent an upper portion of the fence and adapted to carry fluid, said members intersecting directly with a corner post of said fence, a manifold member disposed atop said corner post and having therein interconnected passages, in each of which an end of a tubular member may be disposed in sealed relation, a plurality of fittings disposed at spaced locations along said longitudinal tubular members, and means for providing a flow of fluid along said longitudinal tubular members, whereby said fittings can supply a desirable pattern of fluid for irrigation purposes, each of said fittings being disposed in sealed relation over a hole in one of said longitudinal members, and held thereover by a strap that encircles said longitudinal member.

3. A sprinkler fence for providing an irrigating spray in the general vicinity of the fence, said fence comprising at least one longitudinal tubular member disposed adjacent an uper portion of the fence and adapted to carry fluid, a plurality of fittings clamped at spaced locations along said longitudinal tubular member, through which fluid can flow, and means for providing a flow of fluid to said longitudinal tubular member whereby said fittings can supply a desirable pattern of fluid for vegetation maintenance, said fittings each involving a circular seal disposed in an upper inner portion thereof, which seal is adapted to locate the fitting with respect to a hole provided in said longitudinal tubular member and to provide a fluid-tight relation therewith, and an encircling strap adapted to secure the fitting about said tubular member so as to assure a tight connection at said seal at such time as said strap is properly tightened, the fluid supply to said fence being supplied directly to a corner post, whereby the fluid flows up the post and is then distributed to said longitudinal members by said manifold member.

4. The sprinkler fence as defined in claim 2 in which the fluid supply to said fence is supplied to one of said longitudinal tubular members, and distributed to the other such member by said manifold member.

5. A manifold member adapted for being secured to the upper portion of a fence post of tubular construction, said manifold member having interconnected passages therein, each of said passages being configured for receiving a tubular member in sealed relation, said passages providing an interconection for the flow of fluid from one tubular member to another through the central portion of said manifold member, and means connecting said manifold member in sealed relation to the upper portion of the fence post and providing a passage from one tubular member to the other tubular member through the fence post.

References Cited

UNITED STATES PATENTS

| | | | |
|---|---|---|---|
| 567,916 | 9/1896 | Newell | 239—587 |
| 1,437,524 | 12/1922 | Lee | 239—550 |
| 1,693,556 | 11/1928 | Spencer | 239—208 |
| 1,936,732 | 11/1933 | Renard | 239—209 |
| 2,780,494 | 2/1957 | Keser | 239—587 |
| 3,104,060 | 9/1963 | Briemont | 239—209 |
| 2,576,848 | 11/1951 | Mercier et al. | 239—562 |
| 2,627,429 | 2/1953 | Engleman | 239—587 |
| 2,940,466 | 6/1960 | Speights | 239—208 |
| 3,008,649 | 11/1961 | Bock et al. | 239—602 |
| 3,292,861 | 12/1966 | Kawamura et al. | 239—587 |

FOREIGN PATENTS

| | | |
|---|---|---|
| 141,345 | 11/1934 | Austria. |
| 253,557 | 12/1962 | Australia. |

EVERETT W. KIRBY, *Primary Examiner.*

U.S. Cl. X.R.

137—356; 239—600, 550, 567; 256—1, 45